(12) United States Patent
Chandra

(10) Patent No.: US 6,718,325 B1
(45) Date of Patent: Apr. 6, 2004

(54) APPROXIMATE STRING MATCHER FOR DELIMITED STRINGS

(75) Inventor: Arun Chandra, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 520 days.

(21) Appl. No.: 09/593,907

(22) Filed: Jun. 14, 2000

(51) Int. Cl.[7] .............................................. G06F 17/30
(52) U.S. Cl. ....................................................... 707/6
(58) Field of Search ............................................ 707/6

(56) References Cited

U.S. PATENT DOCUMENTS

| | | | | |
|---|---|---|---|---|
| 4,743,458 A | * | 5/1988 | Gellman et al. ............ | 426/549 |
| 5,216,627 A | * | 6/1993 | McClellan et al. .......... | 708/100 |
| 5,276,616 A | * | 1/1994 | Kuga et al. .................... | 704/10 |
| 5,553,272 A | | 9/1996 | Ranganathan et al. ...... | 395/500 |
| 5,761,538 A | | 6/1998 | Hull ............................. | 395/899 |
| 5,832,480 A | * | 11/1998 | Byrd et al. ...................... | 707/5 |
| 6,026,398 A | | 2/2000 | Brown et al. ................... | 707/5 |
| 6,038,561 A | * | 3/2000 | Snyder et al. .................. | 707/6 |
| 6,076,088 A | * | 6/2000 | Paik et al. ...................... | 707/5 |
| 6,085,186 A | * | 7/2000 | Christianson et al. .......... | 707/3 |
| 6,098,034 A | * | 8/2000 | Razin et al. .................... | 704/9 |
| 6,137,911 A | * | 10/2000 | Zhilyaev ....................... | 382/225 |
| 6,377,945 B1 | * | 4/2002 | Risvik ............................ | 707/3 |

OTHER PUBLICATIONS

R. Cole and R. Hariharan; "Appproximate String Matching: A Simpler Faster Algorithm," Proceedings of the ninth annual ACM–SIAM symposium on Discrete algorithms, 1998, pp. 463–472.

G. Myers, "A Fast Bit–Vector Algorithm for Approximate String Matching Based on Dynamic Programming," Journal of the ACM, vol. 46, No. 3, May 1999, pp. 395–415.

A. Amir and M. Farach, "Efficient 2–dimensional approximate matching of non–rectangular figures," Proceedings of the second annual ACM–SIAM symposium on Discrete algorithms, 1991, pp. 212–223.

* cited by examiner

*Primary Examiner*—Wayne Amsbury
(74) *Attorney, Agent, or Firm*—Rosenthal & Osha L.L.P.

(57) ABSTRACT

A method for comparing two delimited strings, each of which has a plurality of substrings, includes pairing each substring in one of the delimited string with a corresponding substring in the other one of the delimited strings. The method further includes computing a proximity value for each pair of substrings, and computing a set of decaying weights corresponding to the pairs of substrings, multiplying the proximity value for each pair of substrings by the corresponding weight, and summing the weighted proximity values to obtain a strength of match between the delimited strings.

13 Claims, 7 Drawing Sheets

APPROXIMATE STRING MATCHER FOR DELIMITED STRINGS

BACKGROUND OF THE INVENTION

1. Field of the Invention

The invention relates generally to methods and apparatus for matching strings.

2. Background Art

Approximate string matching techniques are used in searching for strings that match a query term. Approximate string matching is an important task in applications such as spell checking in text processors, information retrieval in databases, net and latch mapping in computer-aided design, protein and nuclei sequence identification in molecular biology, and handwriting and speech recognition. Approximate string matching techniques involve finding occurrences of a pattern string $P=p_1p_2 \ldots p_m$ in a text string $T=t_1t_2 \ldots t_n$, where $t_i$, $p_i$ belong to some known alphabet. Approximate string matching techniques find all locations j in T such that there is a suffix of $T=[1 \ldots j]$ matching P with k or fewer differences, where k is greater than or equal to zero. When k is zero, the matching scheme is said to be exact. Approximating string matching techniques have been studied extensively in the field of computer science. See, for example, Amihood Amir and Martin Farach, "Efficient 2-dimensional approximate matching of non-rectangular figures," Proceedings of the second annual ACM-SIAM symposium on Discrete algorithms, 1991, pages 212–223, and Richard Cole and Ramesh Hariharan, "Approximate String Matching: A Simpler Faster Algorithm," Proceedings of the ninth annual ACM-SIAM symposium on Discrete algorithms, 1998, pages 463–472.

Approximate string matching techniques involve computing the "edit distance" between two strings. The "edit distance" between two strings is the minimum number of insertions, deletions, and substitutions required to convert one string to the other. The objective of approximate string matching techniques is to determine the cost edit distance, i.e., the minimum number of edit operations, required to transform one string to the other. The most common method of computing cost edit distance is dynamic programming. See, for example, Gene Myers, "A Fast Bit-Vector Algorithm for Approximate String Matching Based on Dynamic Programming" Journal of the ACM, Vol. 46, No. 3, May 1999, pages 395–415. The exact nature of dynamic programming is known and will not be discussed in this application. There are other methods for determining cost edit distance which do not involve dynamic programming. For example, U.S. Pat. No. 5,761,538 issued to Hull discloses a method for estimating cost edit distance which includes equalizing the lengths of two strings by adding padding elements to the shorter one of the strings. The two strings are sorted according to their element values. Then a sum of substitution costs of the elements in corresponding positions in the sorted strings are calculated. The sum of the substitution costs are then set as the lower bound estimate of the cost edit distance.

SUMMARY OF THE INVENTION

In one aspect, the invention is a method for comparing two delimited strings, each of which has a plurality of substrings. The method comprises pairing each substring in one of the delimited string with a corresponding substring in the other one of the delimited strings, computing a proximity value for each pair of substrings, and computing a set of decaying weights corresponding to the pairs of substrings. The method further comprises multiplying the proximity value for each pair of substrings by the corresponding weight and summing the weighted proximity values to obtain a strength of match between the delimited strings.

Other aspects and advantages of the invention will be apparent from the following description and the appended claims.

DETAILED DESCRIPTION OF THE INVENTION

Embodiments of the invention provide an approximate string matcher which takes two strings as input and produces an index showing the strength of the match between the two strings. The approximate string matcher of the invention is well suited for string matching in computer-aided design (CAD) applications. In computer-aided design of integrated circuits (IC), for example, the functionality of an IC is represented in a logic design hierarchy which is structured as a special kind of graph called a tree. The tree consists of tree nodes. Each tree node corresponds to a function in the IC, i.e., a discrete logic and/or memory element, or any combination of such elements, and is given a unique name. The first or root node in the tree represents the IC. Each link in the root node refers to a child node. A child node with no children is called a leaf node. Each leaf node is connected to at least one other leaf node. Such connection is commonly referred to as net. The set of nets in a logic design is commonly referred to as a netlist. The logic design hierarchy of the IC is stored in a database for later access.

The logic design hierarchy is typically stored using substrings that are separated by predefined delimiters (e.g., ".", ",", "!", "|"). String structures containing substrings that are separated by predefined delimiters are called delimited strings. Each delimited string in the logic design database represents an implementation of a function in the logic design. During design verification, a net or latch in one design model is mapped to another net or latch in another design model. The mapping process typically involves matching delimited strings. The approximate string matcher described herein is designed to efficiently match strings which contain predefined delimiters. This does not mean, however, that the invention is not applicable to strings that do not contain predefined delimiters. The invention is also not limited to CAD applications, but is useful in other applications, such as Internet and database search engines, which commonly require matching of delimited strings. In general, any application that works with hierarchical or tree data structures can benefit from the invention.

Figure 1:
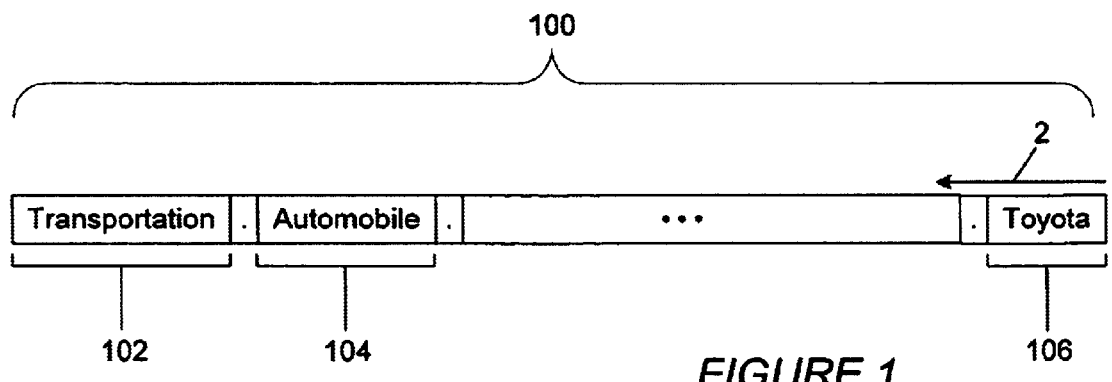
FIG. 1 depicts a graphical representation of a delimited string.

Before describing various embodiments of the invention, it is helpful to define some terminologies that will be used throughout the description. As previously mentioned, a delimited string contains substrings that are separated by predefined delimiters. A substring is a set of consecutive characters belonging to some known alphabet. The size of the substring is equal to the number of characters in the substring. FIG. 1 illustrates a delimited string S 100 which is made of n substrings, e.g., $S_1$ 102, $S_2$ 104, and $S_n$ 106, where n is some positive integer. The substrings are separated by predefined delimiters, e.g., ".". Going from right to left, as indicated by arrow 2, the first substring $S_n$ 106 in the delimited string S 100 will be referred to as the signal name or SIGNAME of the delimited string S 100. All other substrings will be referred to as the hierarchical names or HIERNAMES of the delimited string S 100. In net and latch mapping, the SIGNAME typically represents a net name and, therefore, has the maximum relevance. In general, the SIGNAME has the highest influence on the match and the higher-level HIERNAMES, i.e., the substrings at the left end of the delimited string S 100, have less of an influence on the match.

Figure 2:
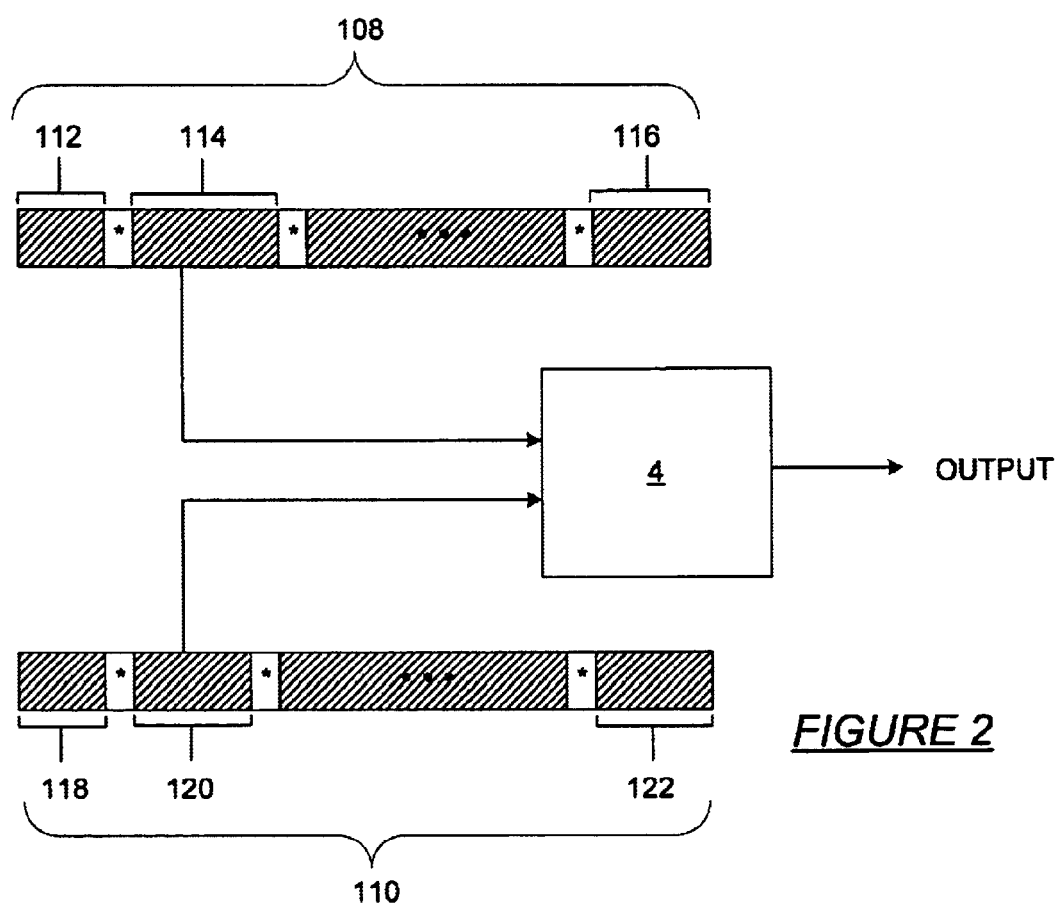
FIG. 2 depicts an approximate string matcher according to one embodiment of the invention.

Various embodiments of the invention will now be described with respect to the accompanying figures. FIG. 2 depicts an approximate string matcher 4 according to one embodiment of the invention. The approximate string matcher 4 takes two delimited strings A 108 and B 110 as input. The output of the approximate string matcher 4 is an index which indicates the strength of match between the two strings A 108 and B 110. Let "*" represent any type of predefined delimiter that may be used in the delimited strings A 108 and B 110. Then, the delimited string A 108 has the general structure $A_1*A_2* \ldots *A_m$, where m is some arbitrary number and $A_1$ 112, ..., $A_m$ 116 are substrings. Similarly, the delimited string B 110 has the general structure $B_1*B_2* \ldots *B_n$, where n is some arbitrary number and $B_1$ 118, ..., $B_n$ 122 are substrings. It should be noted that the number of substrings in string A 108 does not have to be equal to the number of substrings in string B 110, i.e., m does not have to be equal to n.

Figure 3A:
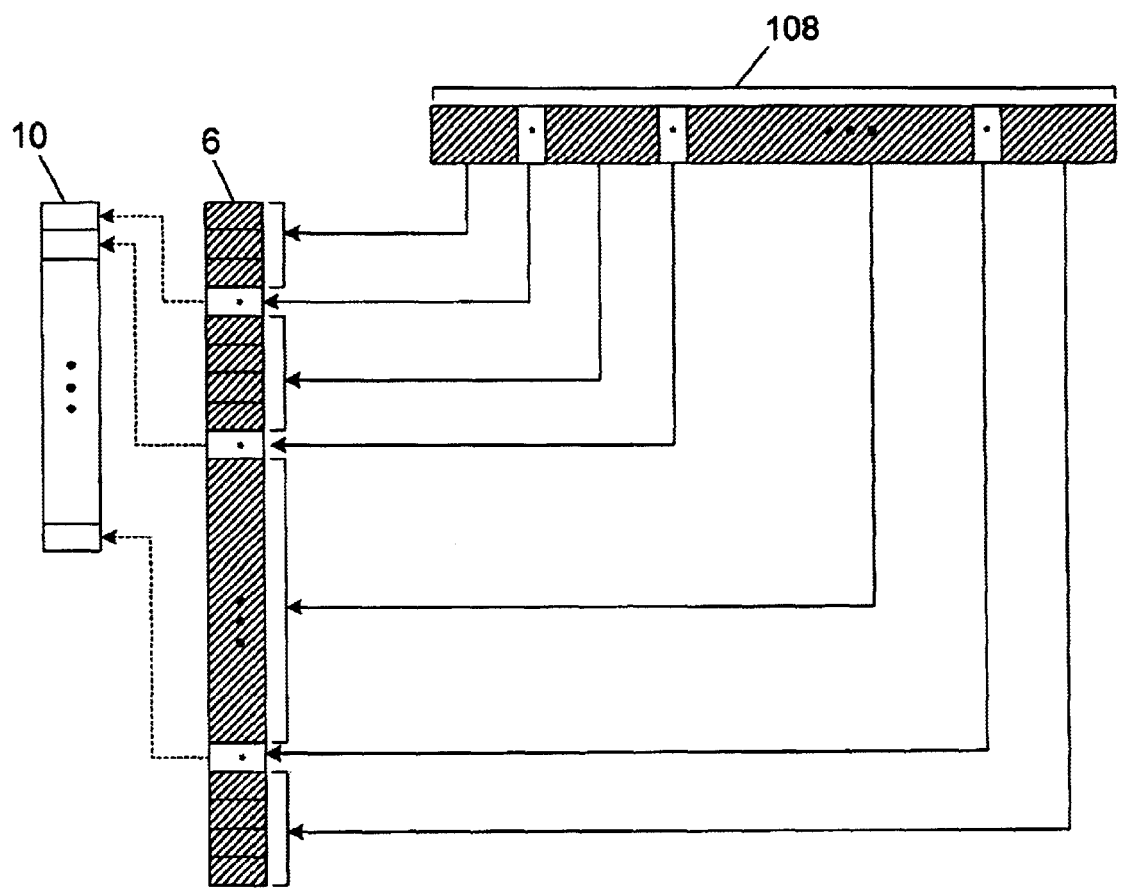
FIGS. 3A and 3B show the approximate string matcher of FIG. 2 storing received input strings in tables.
Figure 3B:
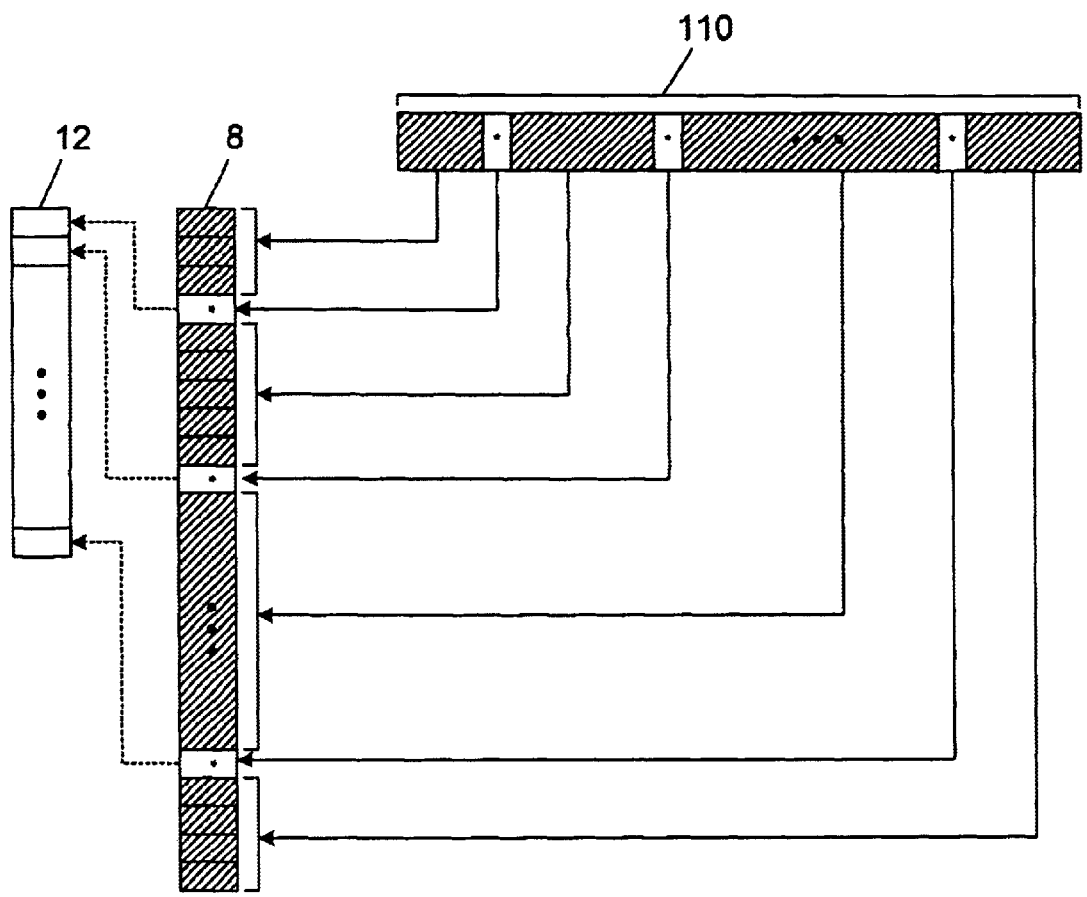

Referring to FIGS. 3A and 3B, the approximate string matcher 4 stores the strings A 108 and B 110 in tables 6 (FIG. 3A) and 8 (FIG. 3B) respectively. For discussion purposes, it is assumed that the characters (not shown) in the strings A 108 and B 110 are received from left to right and are stored in the tables from top to bottom, i.e., the first entries in the tables 6 and 8 correspond to the first characters on the left of the strings A 108 and B 110, respectively. The next step in the string comparison process involves parsing the tables 6 and 8 from top to bottom, or vice versa, to find the locations of all predefined delimiters "*". The locations of the predefined delimiters are stored in tables 10 (FIG. 3A) and 12 (FIG. 3B) Table 10 contains the indices of the predefined delimiters in table 6, and table 12 contains the indices of the predefined delimiters in table 8. For discussion purposes, the tables 6, 8 are assumed to be parsed from top to bottom. In this way, the last entries in tables 10, 12 identify the location of the SIGNAMES of the strings A 108 and B 110, and the first entries in tables 10, 12 identify the location of the highest level HIERNAMES of the strings A 108 and B 110. The approximate string matcher 4 uses the entries in tables 10, 12 to find the locations of the substrings of the strings A 108 and B 110 in the tables 6, 8.

Figure 4:
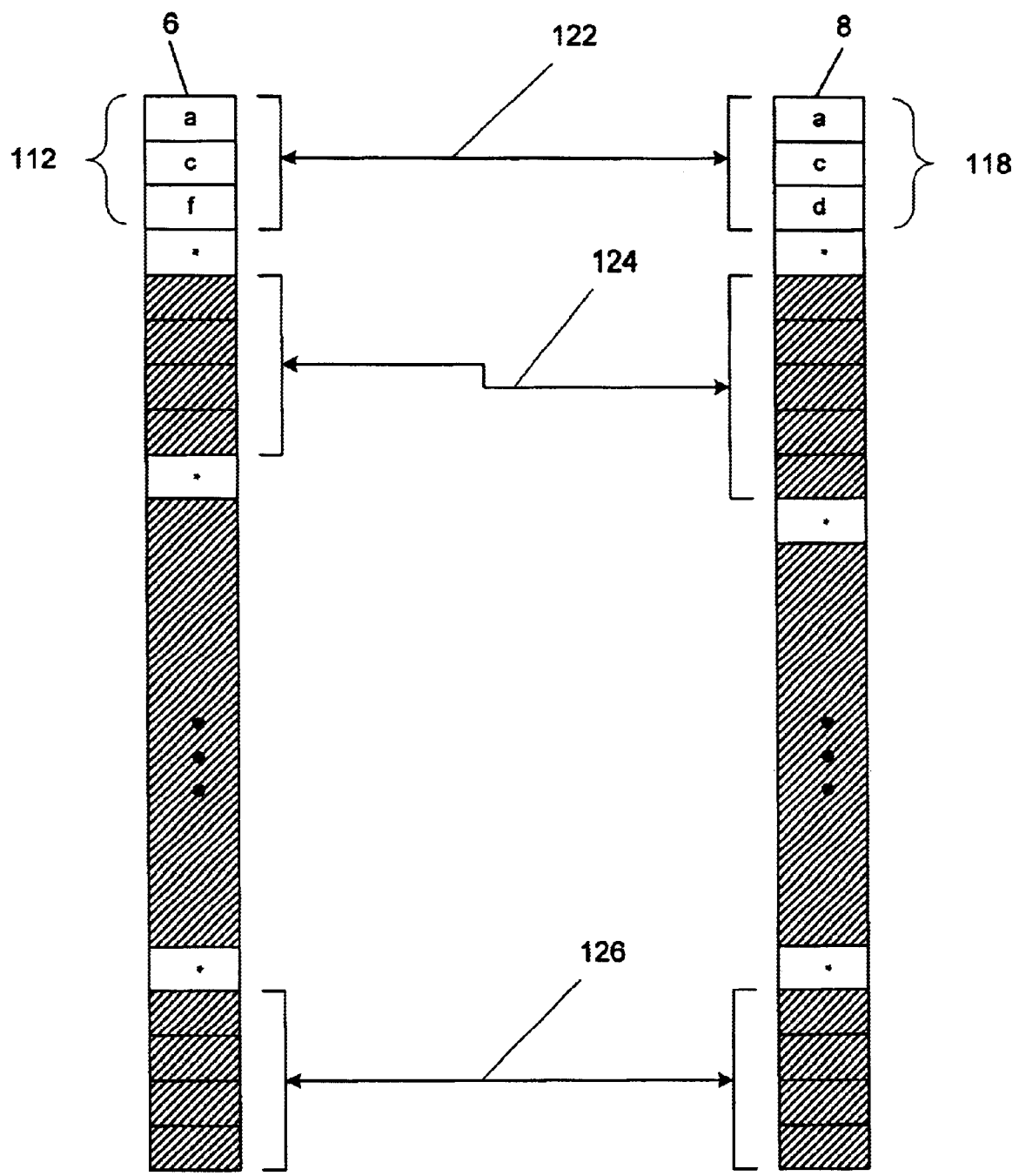
FIG. 4 illustrates how the approximate string matcher pairs substrings for the purpose of determining closeness between the substrings.

The approximate string matcher 4 next pairs corresponding substrings, as shown in FIG. 4, and determines the proximity or closeness of each pair of substrings. The substrings are paired starting from the bottom of the tables 6 and 8 to the top. In this way, the SIGNAMES of the strings A and B are paired together, and the higher-level HIERNAMES of the strings A 108 and B 110 are paired together. It should be noted that if the strings A 108 and B 110 have unequal number of substrings, some of the higher-level HIERNAMES in the string with the higher number of substrings will be paired with null substrings.

The approximate string matcher 4 (in FIG. 2) uses a proximity function to compute the proximity of each pair of substrings. In one embodiment, the proximity function computes proximity by counting the maximum number of substrings of a given size in each of the paired substrings. In order to illustrate how this proximity function works, it is helpful to consider a specific example. Suppose, for example, that substring $A_1$ 112 is "acf" and substring $B_1$ 118 is "acd", as illustrated in FIG. 4. Further, assume that the size of substrings allowed is 1 or 2, then there is one match of "a", one match of "c", and one match of "ac" between the paired substrings $A_1$ 112 and $B_1$ 118. Thus, there are a total of three matches between the paired substrings $A_1$ 112 and $B_1$ 118. The proximity value can be set to three or can be normalized.

In one embodiment, the proximity function is normalized based on the sum of the sizes of the paired substrings. For example, to normalize based on the sum of the sizes of the paired substrings, each match is multiplied by the number of matched characters, and the result is divided by the sum of the size of the substrings $A_1$ 112 and $B_1$ 118. For the example above, the normalized proximity value will then be:

$$\frac{1(a=a)}{6} + \frac{1(c=c)}{6} + \frac{2(ac=ac)}{6} = \frac{4}{6} = 0.666 \qquad (1)$$

The proximity function may also be normalized based on the size of the largest substring in the paired substrings, or based on the size of the smallest substring in the paired substrings It should be noted, however, that normalization of the proximity value is optional. Also, there are a variety of other methods that can be used to determine the proximity value of each pair of substrings. For example, the number of matching vowels or consonants in the paired substrings can serve as a measure of the closeness of the substrings. The semantic meaning or sound of the paired substrings can also serve as a measure of the closeness of the substrings. Other approximate string matching schemes, such as those based on cost edit distance, may also be used to determine the proximity of the substrings.

The proximity values for all the pairs of substrings are calculated, for example, using the process described above or using other suitable method. The proximity values are then stored in a table 14 (shown in FIG. 5), where the first entry in the table 14 corresponds to the proximity between the SIGNAMES of the strings A 108 (in FIG. 3A) and B 110 (in FIG. 3B) and the last entry in table 14 corresponds to the proximity between the highest level HIERNAMES of strings A 108 (in FIG. 3A) and B 110 (in FIG. 3B).

The approximate string matcher 4 (in FIG. 2) next determines a weight corresponding to each proximity value stored in table 14. The weights are obtained using a decay function such as an exponential function, a step function, or a chi-square function. For example, a very simple decay step function could have the form:

$$w(j)=20-j \text{ for } j=1 \text{ to } L \qquad (2)$$

where w is weight and L is the number of entries in the proximity table 14. Thus, for the first entry in the proximity table 14, a weight of 19 will be assigned. For the second entry, a weight of 18 will be assigned, and so forth. An example of a decay exponential function is as follows:

$$w(j) = w(j-1) * 0.8 * \exp\left(\frac{w(j-1) - 20}{30}\right) \quad \text{for } j = 1 \text{ to } L \quad (3)$$

and an example of a decay chi-square function is as follows:

$$w(j) = w(j-1) * 0.8 * \exp\left(\left(\frac{w(j-1) - 20}{30}\right) * \frac{1}{2}\right) \quad (4)$$

for $j = 1$ to $L$ where $w(0)$ is initialized to some selected value. The decay functions shown in equations (2) to (4) are based on step, exponential, and chi-square distribution functions. In general, the decay function used to compute the weights can be based on any arbitrary statistical distribution or function.

Figure 5:
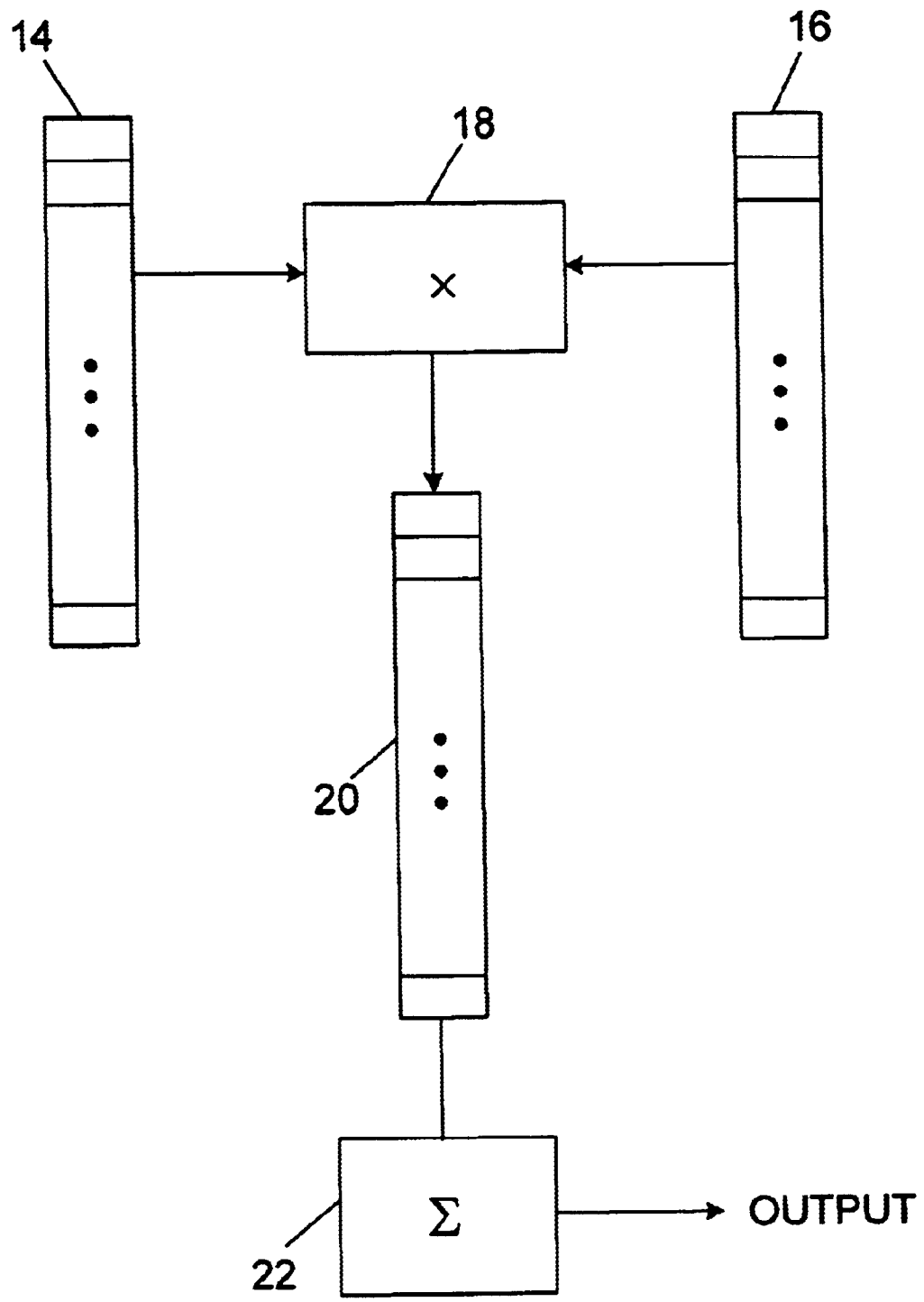
FIG. 5 illustrates how the approximate string matcher obtains a strength of match between the input strings.

The weights are stored in table 16 (shown in FIG. 5). In applications such as net and latch mapping, the SIGNAMES have the maximum relevance in matching, so they are assigned the highest weight. The weights are stored in table 16 such that the highest weight corresponds to the first entry in the proximity table 14 and the smallest weight corresponds to the last entry in proximity table 14. Each proximity value in the proximity table 14 is then multiplied by a corresponding weight in table 16 (shown at 18), and the result is stored in table 20. The entries in table 20 are summed together (shown at 22) to produce the output of the approximate string matcher. The sum of the weighted proximity values provide an indication of the strength of match between the strings A 108 (in FIG. 3A) and B 110 (in FIG. 3B).

Figure 6:
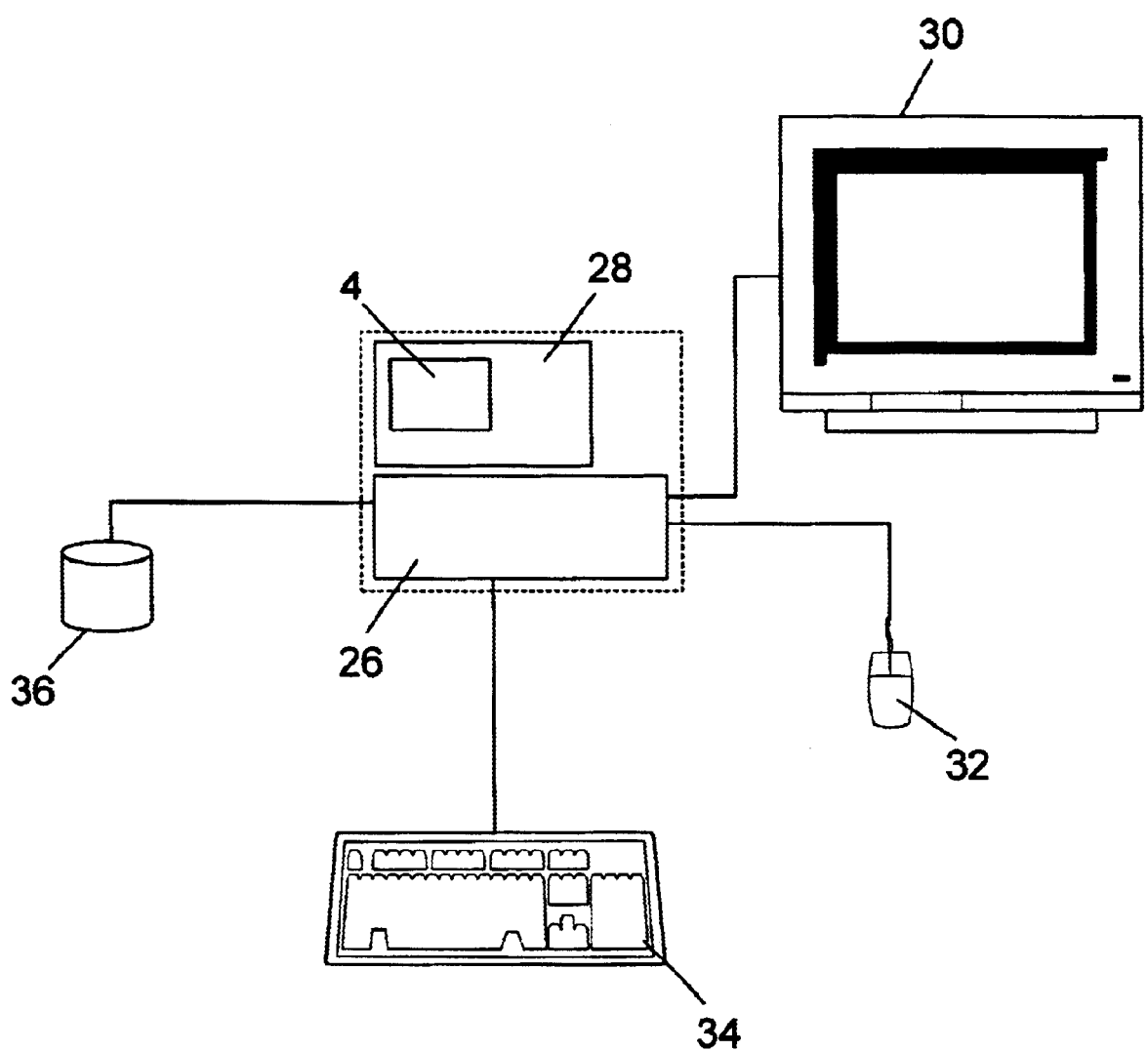
FIG. 6 shows the approximate string matcher in a computer system.

FIG. 6 shows the approximate string matcher 4 implemented as a set of computer instructions in a memory 28. A central processing unit (CPU) 26 may extract the set of instructions and execute them. The CPU 26 is coupled to various input/output (I/O) devices, e.g., display monitor 30, mouse 32, and keyboard 34, and a storage device 36. The CPU 26 may be a personal computer, a minicomputer, a parallel processor, or a networked computer. The data files containing the strings to be matched may be contained in the storage device 36 or other memory device. The data files may be local or remote to the processor 26. The I/O devices enable user input to operate the computer system. In operation, a user or program requests for a string matching operation using the approximate string matcher 4. The CPU 26 then loads the set of instructions into its working memory and executes them. Upon execution, the approximate string matcher 4 receives two strings, which may be supplied by the user or the program requesting the string matching operation. The size of substrings allowed and the weighting function may also be supplied to the approximate string matcher 4. The approximate string matcher 4 then compares the strings and determines the strength of match between the strings as described above. The strength of match produced by the approximate string matcher 4 is some rational number. The input strings match if the strength of match is above a predetermined threshold.

In operation, an application, such as a search engine, would supply two string to be compared to the approximate string matcher 4. The approximate string matcher 4 would compare the strings and produce a strength of match. The application can then look at the strength of match and determine if the two strings are sufficiently close to be returned as a match to a search query.

Figure 7:
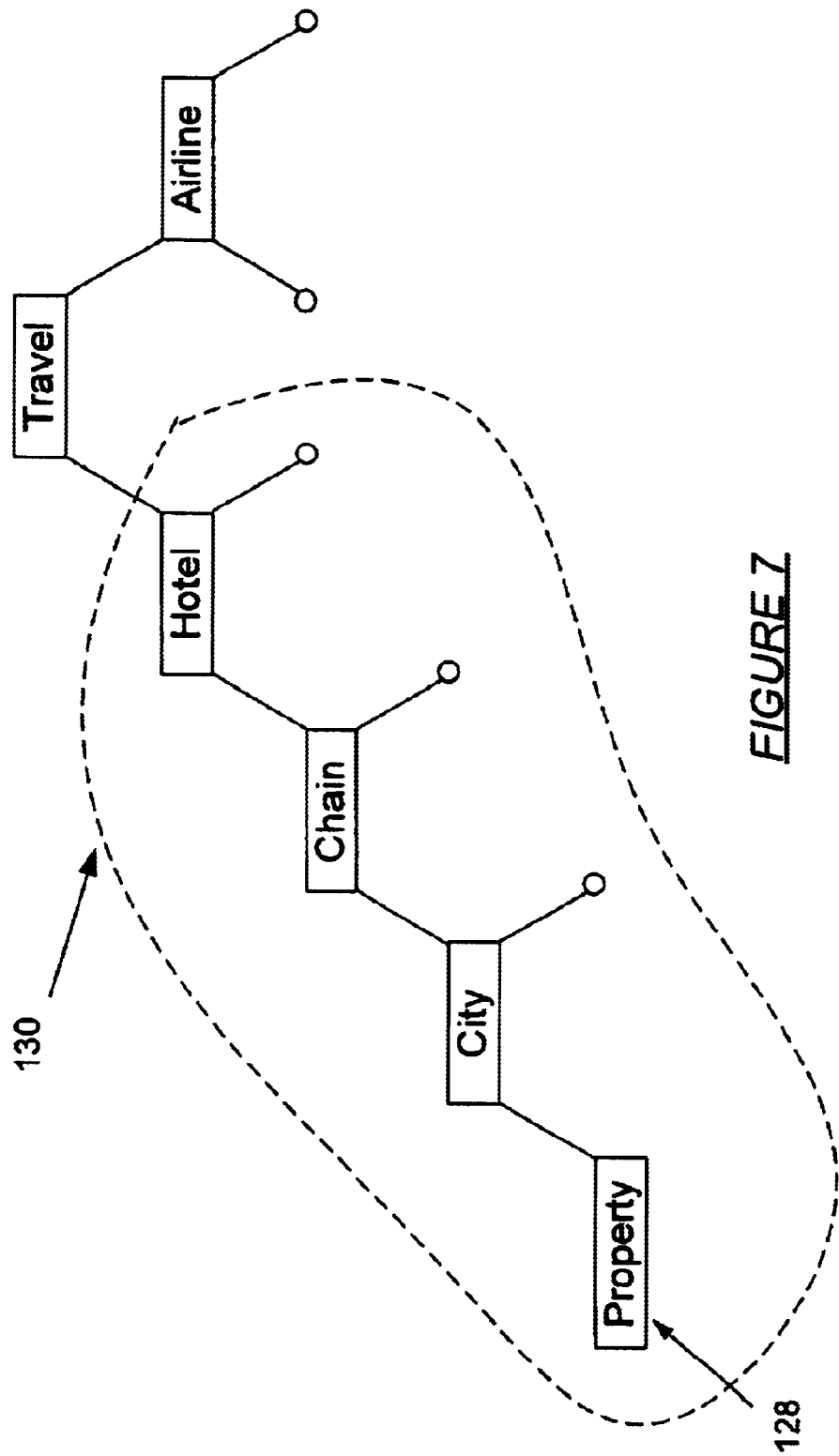
FIG. 7 shows a tree structure.

The invention provides advantages, especially when used for string matching in applications that store data in a hierarchical or tree structure. In such applications, nodes in a tree can be referenced using a delimited string. For example, in the tree structure shown in FIG. 7, the "Property" node 128 can be referenced using the delimited string: "Travel.Hotel.Chain.City.Property" 130. The invention exploits the tree data structure by comparing two strings on a substring level, i.e., node-to-node level, and assigning higher weights to the substrings that are more specific. In a tree structure, the substrings that are more specific are located lower in the hierarchy. By comparing the strings on a substring level, the string matching operation is effectively divided into small string matching operations which can be executed very quickly and efficiently.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for comparing two delimited strings each having a plurality of substrings, comprising:
   pairing each substring in one of the delimited strings with a corresponding substring in the other one of the delimited strings;
   computing a proximity value for each pair of substrings;
   computing a set of decaying weights corresponding to the pairs of substrings;
   multiplying the proximity value for each pair of substrings by the corresponding weight; and
   summing the weighted proximity values to obtain the strength of match between the delimited strings.

2. The method of claim 1, wherein computing a proximity value for each pair of substrings comprises evaluating a proximity function which counts a maximum number of substrings of a given size range that match between the paired substrings.

3. The method of claim 2, further comprising normalizing the proximity function to obtain the proximity value.

4. The method of claim 1, wherein the computing the set of decaying weights comprises calculating a step function.

5. The method of claim 1, wherein the computing the set of decaying weights comprises calculating an exponential function.

6. The method of claim 1, wherein the computing the set of decaying weights comprises calculating a chi-square function.

7. A method for performing a search query, comprising:
   receiving a text string from a data source;
   pairing substrings in a search query string with substrings in the text string;
   computing a proximity value for each pair of substrings;
   computing a set of decaying weights corresponding to the pairs of substrings;
   multiplying the proximity value for each pair of substrings by the corresponding weight; and
   summing the weighted proximity values to obtain a strength of match between the text string and the search query string.

8. A computer-readable medium having stored thereon a program which is executable by a processor, the program comprising instructions for:
   receiving two delimited strings, each of which has a plurality of substrings;

pairing each substring in one of the delimited string with a corresponding substring in the other one of the delimited strings;

computing a proximity value for each pair of substrings;

computing a set of decaying weights corresponding to the pairs of substrings;

multiplying the proximity value for each pair of substrings by the corresponding weight; and summing the weighted proximity values to obtain a strength of match between the delimited strings.

9. The computer-readable medium of claim 8, wherein computing a proximity value for each pair of substrings comprises evaluating a proximity function which counts a maximum number of substrings of a given size range that match between the paired substrings.

10. The computer-readable medium of claim 9, further comprising normalizing the proximity function to obtain the proximity value.

11. The computer-readable medium of claim 8, wherein the computing the set of decaying weights comprises calculating a step function.

12. The computer-readable medium of claim 8, wherein the computing the set of decaying weights comprises calculating an exponential function.

13. The computer-readable medium of claim 8, wherein the computing the set of decaying weights comprises calculating a chi-square function.

* * * * *